United States Patent [19]
Hayes

[11] Patent Number: 5,877,837
[45] Date of Patent: Mar. 2, 1999

[54] SIDE VIEW MIRROR GLARE REDUCTION DEVICE

[76] Inventor: Bob Hayes, 324 North Gertruda, Redondo Beach, Calif. 90277

[21] Appl. No.: 991,712

[22] Filed: Dec. 17, 1997

Related U.S. Application Data

[63] Continuation-in-part of Ser. No. 743,054, Nov. 4, 1996, abandoned.

[51] Int. Cl.⁶ .............................. G02C 7/10; G02C 9/00
[52] U.S. Cl. ................................... 351/44; 351/47; 2/13; 2/449
[58] Field of Search .................. 351/41, 44, 47, 351/48, 140, 141, 158; 2/13, 449

[56] References Cited

U.S. PATENT DOCUMENTS

| | | | |
|---|---|---|---|
| 893,972 | 7/1908 | Bayless | 351/44 |
| 1,067,793 | 10/1913 | Barr | 351/45 |
| 1,239,691 | 9/1917 | Howe | 351/45 |
| 1,353,759 | 9/1920 | Keitz | 351/47 |
| 1,510,850 | 10/1924 | Jacobs et al. | 351/45 |
| 1,643,509 | 9/1927 | Moran | 351/46 |
| 1,676,760 | 7/1928 | Wilson | 351/45 |
| 1,706,429 | 3/1929 | Willard | 351/45 |
| 2,120,727 | 6/1938 | Bell | 351/45 |
| 2,445,153 | 7/1948 | Rearick | 2/14 |
| 2,511,776 | 6/1950 | Kelly | 2/14 |
| 2,981,956 | 5/1961 | Thomson | 2/13 |
| 3,111,675 | 11/1963 | Mora | 351/45 |
| 3,144,658 | 8/1964 | Byron | 2/12 |
| 3,436,761 | 4/1969 | Liautaud et al. | 2/13 |
| 3,596,290 | 8/1971 | Kennedy | 2/12 |
| 4,105,304 | 8/1978 | Baker | 351/47 |
| 4,298,991 | 11/1981 | Recenello | 2/13 |
| 4,678,296 | 7/1987 | Smith | 351/45 |
| 4,828,380 | 5/1989 | Cherian | 351/45 |
| 4,859,047 | 8/1989 | Badewitz | 351/47 |
| 5,189,445 | 2/1993 | Stagner | 351/46 |
| 5,252,997 | 10/1993 | Christenber | 351/49 |

FOREIGN PATENT DOCUMENTS 1138096  6/1957  France .

*Primary Examiner*—Huy Mai
*Attorney, Agent, or Firm*—Curtis L. Harrington

[57] ABSTRACT

An opthalmic shading device depends from a structure worn on the head and provides a shading structure which may be mounted between a source of light to be attenuated and the human eye. A shading structure is attached to a flexible rod which depends from a mounting bracket which is attached to another structure supported by the head, preferably to head wear or to an eye wear frame's temple member. The flexible rod enables the user to adjust the position and angle of the shading structure to interpose it between the user's eye and the light source to be blocked or attenuated. One of the shading structures may be larger than the other, especially where one light source to be blocked presents a larger area of projection than the other. In one embodiment, the shading assemblies depend from a top frame including a brow span and hinged temple arms with lower structures being excised, the top frame fittable on top of conventional eye wear with the shading structure movable to its operable position. In a second embodiment a pair of shading assemblies depend from temple arms of conventional eye wear.

18 Claims, 3 Drawing Sheets

SIDE VIEW MIRROR GLARE REDUCTION DEVICE

This is a Continuation-In-Part of U.S. patent application Ser. No. 08/743,054 filed Nov. 4, 1996, now abandoned.

FIELD OF THE INVENTION

This invention relates to eye shading devices, specifically to one designed to reduce the glare from one's side view mirrors while driving at night, and more particularly to a structure which is utilizable independently of other eye wear, as well as structures which may be used in conjunction with ordinary eye wear.

BACKGROUND OF THE INVENTION

Many people find driving at night to be extremely fatiguing to their eyes. In general, there are two sources for that fatigue: one is the glare of headlights from oncoming traffic, and the second is the glare of headlights from the rear and side view mirrors. The problems created from glare off a rear view mirror have been eliminated quite easily. Auto manufacturers have solved the problems associated with the rear view mirror by outfitting just about every car with a center mirror featuring a dimable night setting to reduce the glare. For the headlights from the oncoming traffic, there have been many U.S. patents issued for eye wear devices which attempt to reduce glare from this source. However, in their endeavors to reduce glare from oncoming traffic, they all have a similar flaws. They severely reduce the driver's overall scope of vision and ability to see clearly by putting shaded or partially shaded lenses directly in front of the driver's eyes. This inhibits the drivers front, forward vision. Until a device is formulated that will reduce the glare from oncoming cars without limiting one's vision, drivers will simply have to cope with the annoyance of oncoming traffic.

Several of these patents, such as U.S. Pat. No. 5,252,997 to Christenberry (October 1993), U.S. Pat. No. 4,828,380 to Cherian (May 1989), and U.S. Pat. No. 4,678,296 to Smith (July 1987), describe devices that attempted to reduce glare from side view mirrors. There are flaws associated with these devices. First, since their attempt to reduce glare from the side view mirrors was in addition to its attempt to reduce glare from oncoming headlights, they would still reduce a driver's main forward vision. Second, some of these devices shade the eyes by positioning opaque material to intercept the peripheral glare. This would create a blind spot in the driver's periphery. Third, these devices can create their own glare for the driver. The designs of these devices will allow headlights from following cars, at a certain undesired angle, to reflect directly off of the shaded lens as well as the frames and into the driver's eye. The driver will receive glare from the very device which he or she is using to reduce glare. In the sunglass industry, this is often referred to as "collateral glare." Fourth, since both cars and people come in a variety of shapes and sizes, the position in one's periphery in which the side view mirrors are located can vary greatly from person to person and from car to car. Most of these devices suffer in that their peripheral shading is not adjustable. The only way these devices could accommodate a variety of cars and trucks would be to design the peripheral shading to be large enough to cover all possible sources of glare. In addition to suffering from severe collateral glare, such a large lens would significantly reduce the peripheral visibility of the driver. The few of these devices which do account for adjustability still suffer from the first three problems.

One particular patent, U.S. Pat. No. 3,596,290 to Kennedy (August 1971), describes an attachable flat visor designed to shade the driver from the glare of the Sun. Although the design does not attempt to shade the driver's forward vision, Kennedy's visor would not work well if attempting to intercept glare from one's side view mirrors. Because the Kennedy visor is designed to be attached directly to the temple arm, and to lie outside the frame, to actually block the glare from the side view mirrors would require that the visor to sit so far forward on the arm that it would extend out in front of the frame itself. Although it would not create an absolute blind spot, the visor, a relatively large lens extending out so far forward, would again significantly reduce a driver's peripheral vision and would also be an unbearable source of collateral glare.

The "Eye Guard and Shield for Spectacles," U.S. Pat. No. 893,972 to Bayless (July 1908), which blocks the light from the side totally, could be used while driving, but although allowing clear forward vision, they would also create blind spots in the driver's periphery. Many recent innovations in sunglasses, such as Oakley's U.S. Pat. No. 4,515,448 to Tackles (June 1985), do in fact include peripheral shading, but again only in addition to shading of light entering from the forward scope of vision. This would once again unsafely reduce one's overall visibility at night. Obviously, it is unsafe to drive at night while wearing regular sunglasses.

To successfully eliminate glare from side view mirrors, a device must not impair a driver's normal forward vision, must not create any collateral glare, must accommodate a variety of drivers and cars, and must not create a blind spot nor significantly reduce peripheral vision. What is needed is a device that will reduce the glare from the reflection of headlights in the side view mirrors of an automobile. The needed device should reduce strain to the eyes of a driver. Such a device should in no way inhibit a driver's forward field of vision. The solution should provide a device that will be adjustable to any driver in any car or truck, and not significantly reduce the peripheral vision of a driver. The needed device should not create collateral glare for the driver, nor create a blind spot. The needed device should be inexpensive to manufacture and easily adapt to accommodate the specific needs of consumers. Clearly, none of the patents mentioned above meet all these criteria.

SUMMARY OF THE INVENTION

An opthalmic shading device depends from any structure worn on or about the head and provides a shading structure which may be mounted between a source of light to be blocked or attenuated and the human eye. The shading structure is attached to a flexible rod which depends from a mounting bracket which is glued, riveted, bolted or screwably attached to a structure supported by the head, and preferably to head wear or to an eye wear frame's temple members. The flexible rod enables the user to adjust the position and angle of the shading structure to interpose it between the user's eye and the light source to be blocked or attenuated. One of the shading structures may be larger than the other, especially where one light source to be blocked presents a larger area of projection than the other. In one embodiment, the shading assemblies depend from a top frame including a brow span and hinged temple arms with lower structures being excised, the top frame fittable on top of conventional eye wear with the shading structure movable to its operable position. In a second embodiment a pair of shading assemblies depend from temple arms of conventional eye wear.

BRIEF DESCRIPTION OF THE DRAWINGS

The invention, its configuration, construction, and operation will be best described in the following detailed description, taken in conjunction with the accompanying drawings in which.

DETAILED DESCRIPTION OF THE PREFERRED EMBODIMENT

Figure 1:
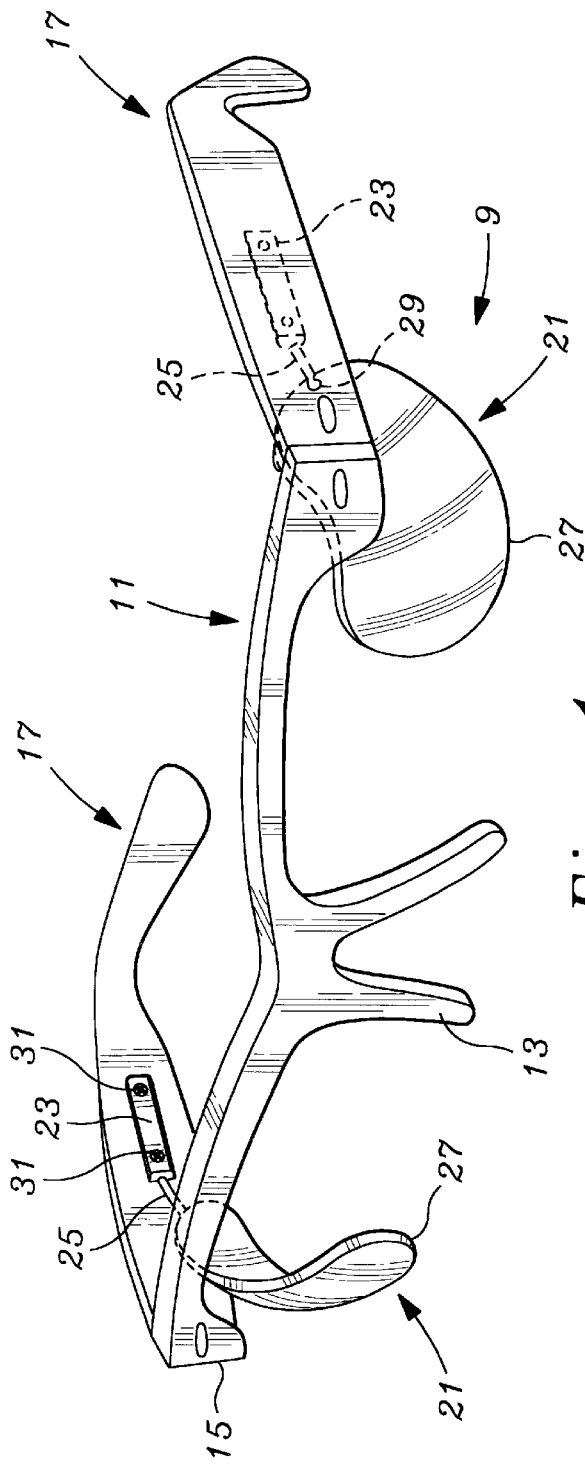
FIG. 1 shows the side view mirror glare reduction device as it appears normally with its shading apparatus attached to a modified eye wear frame.

This glare reduction device has a first embodiment as a simple device consisting of shading apparatus supported by an eye wear frame or other head wear structure, an eye wear frame, and associated structures shown in FIG. 1 as glare reduction device 9. The eye wear frame consists of a brow span 11 which is made of materials having the same shape and structural integrity as the upper portion of conventional eye wear. The brow span 11 has a nose rest 13 which extends downward far enough to make adequate contact with the nose and may be formed by excising the lower middle portion of an eye wear frame. The brow span 11 extends away from the nose rest portion 13 to a pair of ends 15. The portion of brow span ends 15 which would normally extend downward have been excised. A pair of temple arms 17 are pivotally attached near the ends 15 of the brow span 11, similar to the attachment in conventional eye wear. The lower truncation serves two purposes. First, for wearers who do not need lens eye correction, the removal of material below the brow span portion reduces the weight of the glare reduction device 9. For users with existing eye wear or goggles, the truncated lower structures of the glare reduction device 9 enables it to fit inside such conventional eye wear.

Partially seen at the ends 15 of the brow span 11, and near the forward portions of the pair of temple arms 17, the securing portions of a respective pair of hinges 19 are seen extending partially extending through the brow span 11 and temple arm 17 material. The temple arms 17 may be of any type sufficient from which structural support may be had.

Each temple arm 17 has a shading assembly 21, including a mounting bracket 23 from which a flexible rod 25 extends to support a shading apparatus or structure 27. Shading structure 27 as seen in the drawings may be semi-transparent, a term used to describe a darkened lens. The darkening may be accomplished through a gray scale darkening, or any other mechanism to reduce the intensity of light transmitted to the user. For example, one side of the shading structure 27, preferably the side facing away from the user, could be mirrored, coated, or treaded with a graded material to reject different frequencies of light, or light of different characteristics. As a further example, the shading structure 27 could be polarized, or have a polarized coating oriented to reject or attenuate glare light and to selectively admit light which will give the most even view of the users field of view.

Note the shape of the shading structure 27 as being a somewhat flattened oval shape and which is shown as also possibly being slightly curved along its longest extent. In some cases curvature can prevent collateral glare from any light which strikes the surface of the shading structure facing the user. Other steps can be taken to reduce this light, such as changing the surface texture of the shading structure facing the user, and perhaps providing a raised rim at the forward most portion of the shading structure to shade off any light of very low angular incidence with respect to the surface of the shading structure 27 adjacent the user.

The shading structure 27 can be injection molded around the flexible rod 25, or any other method of attachment is preferable so long as sufficient structural stability enables the angular pivot position of the shading structure 27 with respect to the bracket 23 to be achieved in any direction. Also to be achieved, is the relative pivot of the shading structure 27 with respect to the general axis of the flexible rod 25, taken at the flexible rod 25 closest point of the shading structure 27. The end of the flexible rod 25 within the shading structure 27 may be bent, hooked, or burred in order to provide a greater degree of fixation and to insure that the shading structure 27 does not rotate on the end of the flexible rod 25. The flexible rod 25 is preferably made of a solid wire material so that the structures 27 may be optimally adjusted. Each lens 10 is curved to approximately match the curvature of one's face.

With the shading assembly 21 enabling the shading structure 27 to be positioned on the inside of the eyeglass frame portion of the shading device 9, and which is also preferably to be positioned on the inside of any head wear structure to enable free movement about the user's eyes, the shading structure 27 will be more easily be able to intercept glare from the side view mirrors and reduce strain on the user's eyes. Since there are no blocking structures or other shading attached to the front of the shading device 9, a user's forward field of vision will remain clear and uninhibited. Because the shading structure 27 is positionally adjustable, any driver in any type of truck or car will be able to move it up or down, forward or backward, and in or out from his or her eye so that the glare from the mirror may be intercepted, and reduced or eliminated.

The need for an unduly large shading structure 27, such as a lens is eliminated because the adjustability and the inside mounting feature of the shading assembly 21 enables the use of a much smaller lens will be adequate to intercept all possible sources of glare. A smaller shading structure will also greatly increase a driver's peripheral vision as compared to a large lens, for the same degree of side-view mirror light blockage.

Several aspects of the glare reduction device 9 will prevent a driver from receiving any collateral glare from the shading structure 27, especially where the shading structure 27 is a lens. Because the lens shading structure 27 is curved, adjustable, and mounted on the inside of the frame, it will be closer to the eye and out of the path of any light that may reflect back into the eye. Furthermore, since the a lens shading structure 27 is small, there is less surface from which light can reflect. Further, because the glare reduction device 9 is of such simplicity and having a small number of parts, this shading device 9 will be inexpensive to manufacture. In addition, where the glare reduction device 9 is a smoky or grey scale shaded clear structure, the use of a shading device 9 will not actually reduce the peripheral vision of the user. The use of the glare reduction device 9 by a driver will be equivalent to having light transmission reduction controls located at the side view mirrors or some other shading mechanism located at those side view mirrors. But since such controls are not available and since a user may drive different cars, such a solution is not assured in every instance. Because of the simplicity of the glare reduction device 9, this shading device will easily adapt to accommodate the specific needs of consumers.

The size and shapes of the shading assembly 21 may be varied to accommodate different sizes and shapes of side view mirrors, especially where a custom utilization is desired. However for most situations, the general configuration is desired which will adequately handle the physics of the side rear view mirrors of the average vehicle. In a left drive vehicle, the left rear view mirror is located from 40° to about 50° to the left of the center or straight on view line of a driver, and located downward over a wide range of from 5° to 50° down, depending upon how short/small or big/tall the driver is, and depending upon whether the vehicle is high profile like a sport utility vehicle, or low profile like a sports car or hot rod. It is the ability of the shading assembly 21 to enable the shading structure 27 to achieve a high degree of pivot in the vertical plane which accommodates this drastic range of vertical difference which a user-driver may encounter.

The right most rear view mirror is located the same amount forward of the driver (in Cartesian coordinates) but much farther to the right, giving an angle from about 60° to about 70° to the left of the center or straight on view line of a driver, and located downward over a slightly narrower range of from 5° to 40° down, again depending upon how short/small or big/tall the driver is, and again depending upon whether the vehicle is high profile like a sport utility vehicle, or low profile like a sports car or hot rod. With regard to perceived size, for a left drive vehicle, the left rear view mirror takes up a larger area of the drivers field of view than an equal sized right side rear view mirror simply because it is closer. Therefore, the shading structure 27 for the user's left side may tend to be slightly larger in size, where rear view mirrors of equal size are present.

It has been found that a preferable size for the shading assembly 21 (for left side drive vehicles) includes a left side shading structure 27 having an oval length (greater dimension) of about 1.4 inches, and a width (lesser dimension) of about 0.8 inches. A right side shading structure 27 may have an oval length (greater dimension) of about 1.1 inches, and a width (lesser dimension) of about 0.7 inches. Thus, the side having the rear-view mirror closest to the driver will preferably be slightly larger.

The mounting bracket 23 has been found to work well with a preferable length of 0.6 inches, a preferable width facing the temple arm 17 of about 0.15 inches, and a width in a direction extending away from the temple arm 17 of about 0.12 inches. The mounting bracket 23 can be formed as a single injection molded plastic piece, or it can be formed of a pair of metal plates having screws or rivets which sandwich the plates together against the end of the flexible rod 25. The length of flexible rod 25 extending between the bracket 23 and the shading structure 27 is preferably about 0.5 inches. It is understood that this length can increase while moving the bracket 23 rearwardly on the temple arm 17, or it can be decreased while moving the bracket 23 forwardly on the temple arm 17. A longer length of flexible rod 25 may result in less angular flexure.

Referring to FIG. 1, the shading structure 27 immediately adjacent the flexible rod 25, a small amount of buildup material 29 is shown as a triangular wedge which is used to accommodate the end of the flexible rod 25 within the material of the shading structure 27. This is preferable where the thickness of the shading structure is thin, but the buildup material 29 will not compromise the connection with the end of the flexible rod 25. Thinner shading structures 27 will present less weight and occupy less space within the vicinity immediately before the user's face. The amount of buildup material 29, the extent into the shading structure 27 which the flexible rod 25 extends, and the thickness and degree of shading of the standing structure 27 will all depend upon the type of material chosen for the shading structure 27.

On the bracket 23 are seen a pair of screws 31 which are used to secure the bracket 23 to the temple arm 17. Screws 31 can be used in conjunction with other holding structures, including glue and adhesive. The screws 31 should be of abbreviated length to limit their intrusion into the temple arm 17 so as not to extend through to the other side. It is preferable that a pair of holes, preferably chamfered, be formed in the mounting bracket 23 to exactly set the depth to which the screws 31 will penetrate.

Figure 2:
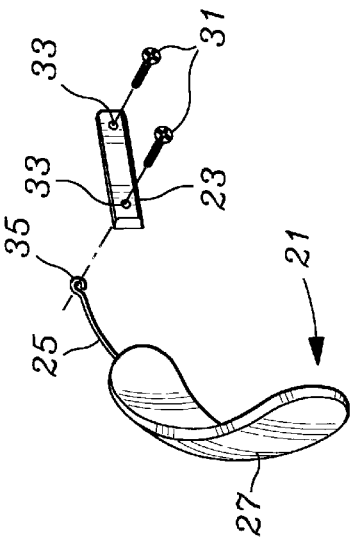
FIG. 2 illustrates an isolated right side shading apparatus apart from the eye wear frame of FIG. 1.

Referring to FIG. 2, an isolated, partially exploded view of the shading assembly 21 is seen. Note that the shading structure 27 may be curved as is seen in FIG. 2, and that it may also be parabolic. The curvature of the shading structure 27 helps to prevent collateral glare from the low angle which the eye has with respect to the surface of the shading structure 27. It is not necessary for the shading structure 27 to be either curved or parabolic, but these shapes can assist in reducing glare, and also helps the structure 27 to more efficiently exist in the space in front of the user's eyes.

The shading structure 27 and the mounting bracket 23 may be molded along with the flexible rod. The ends of the flexible rod may be burred, bent, flayed, or otherwise exhibit a deviation to simple linearity in order to make sure that the mounting bracket 23 holds the flexible rod 25 securely. Preferably the mounting bracket 23 will be molded or injection molded about the end of the flexible rod 25 to be secured. As is seen in FIG. 2, the end of the flexible rod 25 which will be attached into the mounting bracket 23 is hook shaped. Also note that the mounting bracket 23 has a pair of chamfered bores 33. When the molding process occurs, the mold is opened and will have a peg to form a void which will form one of the chamfored voids nearest the end of the mounting bracket from which the flexible rod 25 will extend. The mold is opened and the end of the flexible rod is formed into a hook shape 35 around the mold peg, the mold then closed and injected with plastic or other material. The resulting structure is a bracket 33 having a bore 33 surrounded by the hook end 35 of the flexible rod 25. This enables the flexible rod 25 to garner additional stability from the screw 33 which is surrounded by the hook end 35. This insures that good material contact is made between the ends of the flexible rod and the shading structure 27 and mounting bracket 23, especially since shading structure 27 is to be pivoted and fixedly twisted with respect to the mounting bracket 23 to enable it to achieve small exacting adjustments.

The bracket 23 can be not much more than a block of plastic into which the end of the rod 25 is molded. The material chosen for the rod 25 is ideally a material which can be repeatedly flexed and bend without breaking. Attachment of the mounting bracket 23 to the temple arm 23 can be achieved by using screws, fasteners, gluing, or other method. However, where the glare reduction device 9 is made as a custom device, the rod 25 can be molded along wit the temple arm 17, to emerge from the inside surface thereof at an angle, in much the same way as was described for molding using the bracket 23. The use of a bracket 23 for support is to enable the glare reduction device 9 to be easily installed on any conventional support located near the eyes, including and not limited to visors, goggles, hats, head wear and headbands, to name a few. The bracket 23 only must have a sufficient area to support the structure 27 and to withstand manipulation of the structure 27 against the mounting bracket 23. Where a weaker glue is utilized, the contact surface area of the bracket 23 against the temple arm 17 would need to be increased. The bracket 23 is rectangular, but other shapes are equally acceptable so long as enough material is present to both secure the end of the rod 25 and to provide sufficient area for contact with the temple arm 17.

Figure 3:
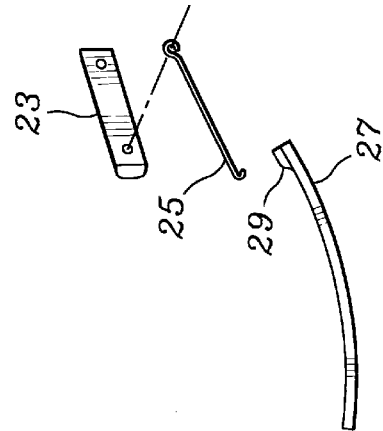
FIG. 3 illustrates an isolated left side shading apparatus apart from the eye wear frame of FIG. 1.

Referring to FIG. 3, the shading assembly of the glare reduction device above is also isolated, and has a shading structure 27 which is or may be slightly larger than the shading structure 27 of FIG. 2. When a driver is nearer to one of two rear-view mirrors of the same size, the closer mirror has an optical profile of greater area. To give equal shading, or an equal probability of blocking out a constant amount of shading, the shading structure 27 which lies between the user and the closest mirror should be slightly larger in area. In a right hand drive vehicle where the driver is nearer the right door, the right shading assembly would normally have a slightly larger shading structure 27. The shading structure 27 of FIG. 3 is rotated to better illustrate the buildup material 29, as well as a planar shape, which is an option to the curved shape shown in FIG. 2.

Figure 4:
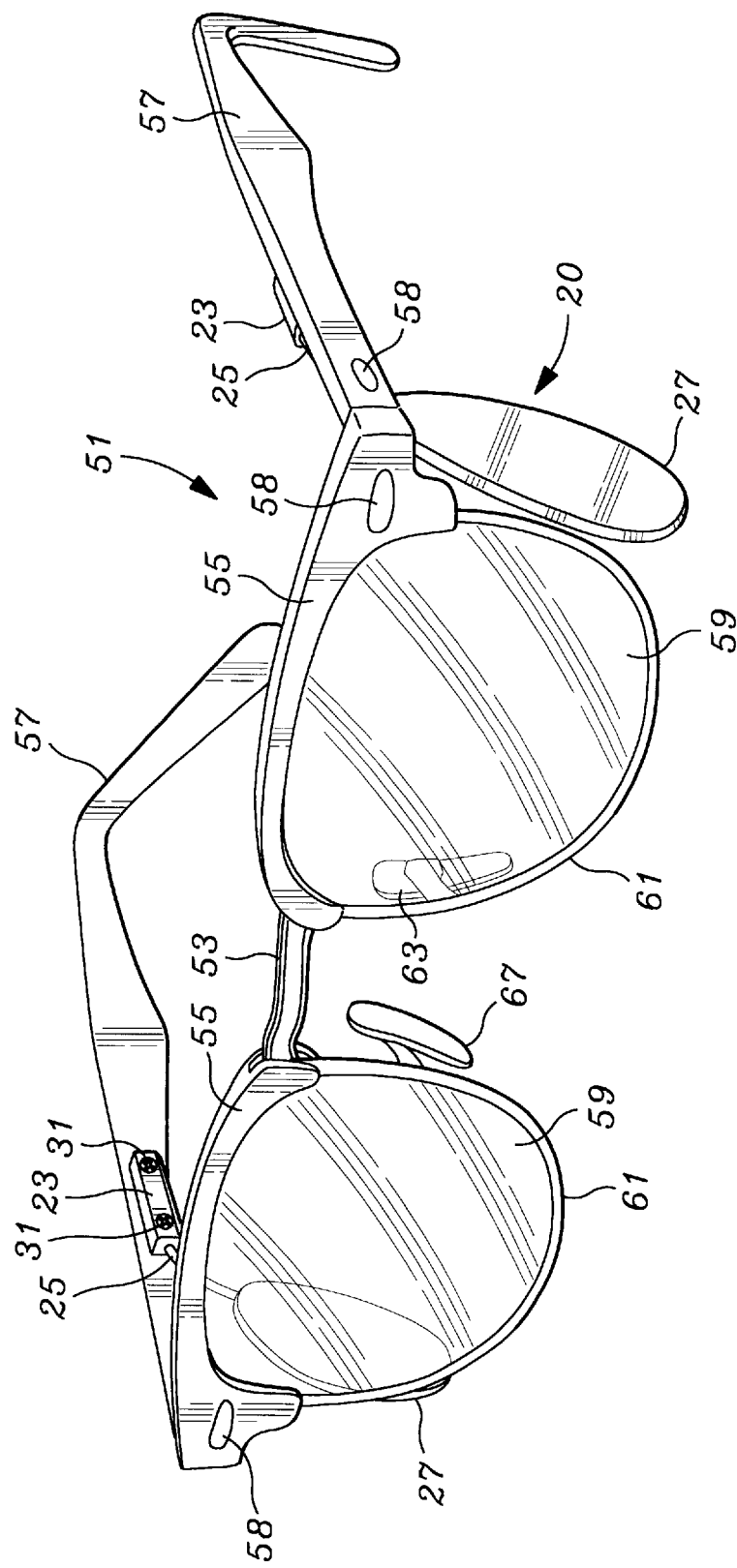
FIG. 4 illustrates a perspective view of a pair of conventional eyeglasses fitted with the shading apparatus of FIGS. 1–3.

Referring to FIG. 4, a perspective view of a standard eye wear assembly 51 fitted with the shading assembly 21 includes a metal nose bridge 53 connecting a pair of brow span members 55 which are hingedly attached to a pair of temple arms 57, with hinges 58. As before, the shading assembly 21 is mounted on the temple arms 57. Extending downwardly from the brow span members 55 are a pair of lenses 59 bound on their lower and side edges by a metal rim 61. A pair of nose pads 63 depend from the metal rim 61.

Where the shading structure 27 is positioned close to the lens 59, the folding over of the temple arms 17 may cause the shading structure 27 to brush the lens 59, but the contact is momentary. Since the shading structure 27 is limited in its forward movement, it will, even at its most forward displacement be no closer to the lens 59 than to gently brush it on closure, and when such brief contact occurs, the rod 25 allows the shading structure 27 to gently flex to accommodate closure of the temple arms 57.

Figure 5:
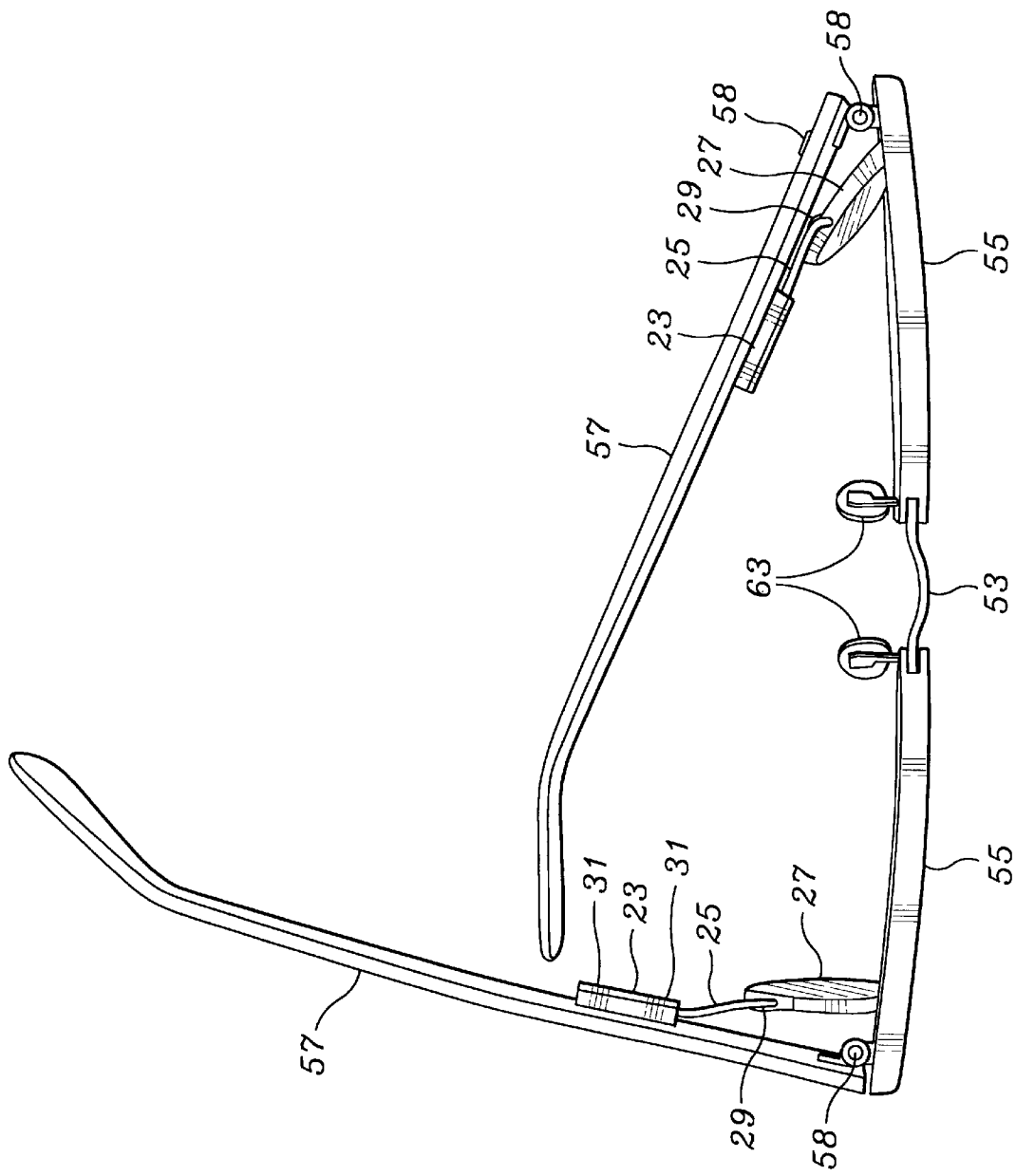
FIG. 5 illustrates a top view of the conventional eyeglasses seen in FIG. 4 and illustrates how the folding temples are able to operate with some flexure of the shading apparatus.

This brushing action is shown to occur briefly and to be completely accommodated in FIG. 5. Where the standard eye wear assembly 51 wearer needs the shading structure 27 to be moved completely out of the way, it can be angled downward, or even angled upward to completely displace itself from the peripheral field of view, and then folded back into place easily. Also seen in FIG. 5 is the small amount of build up material 29.

While the present invention has been described in terms of an optical alignment system which may be utilized to closely attenuate light from a remote source, and which is shaped to prevent unwanted collateral glare and low angle reflection. One skilled in the art will realize that the structure and techniques of the present invention can be applied to many similar appliances. The present invention may be applied in any situation where close control of light admittance is desired with consistency.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A shading structure comprising:
   a mounting bracket;
   a flexible rod having a first end extending within said mounting bracket and bendably supported by said mounting bracket, and a second end extending opposite from said first end and along an elongate non linear axis;
   a shading structure supported by said second end of said flexible rod and angularly positionally adjustable with respect to said mounting bracket and positionally adjustable about said non linear axis, said mounting bracket, said flexible rod and said shading structure forming a shading assembly.

2. The shading structure as recited in claim 1, and further comprising a head wear support from which said bracket is attached and from which said bracket depends.

3. The shading structure as recited in claim 1, and wherein said shading structure is in the shape of a flattened oval.

4. The shading structure as recited in claim 3, and wherein said oval shape has a major axis and is curved along said major axis.

5. The shading structure as recited in claim 3, and wherein said flattened oval shape has a first end nearer said flexible rod having a smaller radius than a second opposite end.

6. The shading structure as recited in claim 1, and wherein said shading structure is molded with said second end of said flexible rod.

7. The shading structure as recited in claim 6, and wherein said second end of said flexible rod has a hook shape which is molded with said shading structure.

8. The shading structure as recited in claim 6, and wherein said first end of said flexible rod has a hook shape which is molded with said mounted bracket.

9. The shading structure as recited in claim 8, and wherein said mounting bracket has a bore to facilitate attachement thereof, and wherein said hook shape of said first end of said flexible rod surrounds said bore.

10. The shading structure as recited in claim 1, and wherein said mounting bracket is molded with said first end of said flexible rod.

11. The shading structure as recited in claim 1, and wherein said shading structure is semi-transparent.

12. The shading structure as recited in claim 1, and wherein said bracket further comprises a block of material molded around said flexible rod having a first aperture at least partially surrounded by said flexible rod for securing said bracket to a support structure.

13. The shading structure as recited in claim 1, and further comprising head wear, said mounting bracket secured to said headwear.

14. The shading structure as recited in claim 13, and wherein said headwear further comprises:
   a brow span member having a first end and a second end;
   a first temple member supported near said first end of said brow span member;
   a second temple member supported near said first end of said brow span member, and wherein said bracket is supported by one of said first and said second temple members.

15. The shading structure as recited in claim 14, and wherein said bracket of said shading assembly is attached to said first temple member.

16. The shading structure as recited in claim 15, and further comprising a second shading assembly having a bracket attached to said second temple member.

17. An eye wear and shading structure comprising:

an eyewear structure having a brow span having a first end and a second end and supporting an opthalmic lens;

a first temple arm depending from said brow span near said first end of said brow span;

a second temple arm depending from said brow span near said second end of said brow span;

a mounting bracket depending from said first temple arm;

a flexible rod having a first end extending within said mounting bracket and bendably supported by said mounting bracket, and a second end extending opposite from said first end and along an elongate non linear axis;

a shading structure supported by said second end of said flexible rod and angularly positionally adjustable with respect to said mounting bracket and positionally adjustable about said non linear axis, said mounting bracket, said flexible rod and said shading structure forming a shading assembly.

18. The shading structure as recited in claim 17, and further comprising a second shading assembly having a bracket attached to said second temple member.

* * * * *